United States Patent
Hegde

(10) Patent No.: US 11,586,982 B2
(45) Date of Patent: Feb. 21, 2023

(54) ELECTRONIC AND ATOMIC STRUCTURE COMPUTATION UTILIZING MACHINE LEARNING

(71) Applicant: Samsung Electronics Co., Ltd., Suwon-si (KR)

(72) Inventor: Ganesh Hegde, Houston, TX (US)

(73) Assignee: Samsung Electronics Co., Ltd., Suwon-si (KR)

(\*) Notice: Subject to any disclaimer, the term of this patent is extended or adjusted under 35 U.S.C. 154(b) by 341 days.

(21) Appl. No.: 16/798,245

(22) Filed: Feb. 21, 2020

(65) Prior Publication Data

US 2021/0081834 A1 Mar. 18, 2021

Related U.S. Application Data

(60) Provisional application No. 62/902,324, filed on Sep. 18, 2019.

(51) Int. Cl.
| | |
|---|---|
| *G06F 1/18* | (2006.01) |
| *G06N 20/00* | (2019.01) |
| *G06N 3/04* | (2023.01) |
| *G06N 10/00* | (2022.01) |

(52) U.S. Cl.
CPC ........... *G06N 20/00* (2019.01); *G06N 3/0454* (2013.01); *G06N 3/0472* (2013.01); *G06N 10/00* (2019.01)

(58) Field of Classification Search
USPC ............................ 706/12, 5, 6, 7, 15, 16, 25
See application file for complete search history.

(56) References Cited

U.S. PATENT DOCUMENTS

| | | | |
|---|---|---|---|
| 6,763,309 B2 | 7/2004 | Kieken et al. | |
| 7,292,958 B2 | 11/2007 | Ceder et al. | |
| 7,882,052 B2 | 2/2011 | Szathmary et al. | |
| 8,671,369 B2 * | 3/2014 | Ahn ..................... | B82Y 10/00 716/132 |

(Continued)

FOREIGN PATENT DOCUMENTS

| | | | | |
|---|---|---|---|---|
| CN | 108596994 A | * | 9/2018 | ............. A61B 5/055 |
| CN | 111144565 A | * | 5/2020 | |

(Continued)

OTHER PUBLICATIONS

Blaschke, Thomas, et al., "Application of generative autoencoder in de novo molecular design," arxiv.org, Cornell University Library, Nov. 2017, XP080839053, 13 pages.

(Continued)

*Primary Examiner* — Brian Ngo
(74) *Attorney, Agent, or Firm* — Lewis Roca Rothgerber Christie LLP

(57) ABSTRACT

A method for obtaining learned self-consistent electron density and/or derived physical quantities includes: conducting non-self-consistent (NSC) calculation to generate a first NSC dataset X1 from a first plurality of configurations of atoms; conducting self-consistent (SC) calculation to generate a first SC dataset Y1 from the first plurality of configurations of atoms; mapping the first NSC dataset X1 to the first SC dataset Y1 utilizing machine learning algorithm to generate a mapping function F; and generating a learned self-consistent data Y2 from a new NSC data X2 utilizing the mapping function F.

20 Claims, 7 Drawing Sheets
(1 of 7 Drawing Sheet(s) Filed in Color)

(56) References Cited

U.S. PATENT DOCUMENTS

| | | | |
|---|---|---|---|
| 10,043,261 | B2 | 8/2018 | Bhaskar et al. |
| 10,360,506 | B2 | 7/2019 | O'Brien et al. |
| 2017/0039469 | A1 | 2/2017 | Majumdar et al. |
| 2017/0161635 | A1 | 6/2017 | Oono et al. |
| 2018/0032663 | A1 | 2/2018 | Yoo et al. |
| 2018/0120479 | A1* | 5/2018 | Wood ............... G01V 99/005 |
| 2018/0225426 | A1 | 8/2018 | Murthy |
| 2019/0155977 | A1 | 5/2019 | Hegde et al. |
| 2019/0251459 | A1 | 8/2019 | Han et al. |
| 2019/0302290 | A1 | 10/2019 | Alwon |
| 2019/0354801 | A1 | 11/2019 | Sohn et al. |
| 2019/0354804 | A1 | 11/2019 | Ros Sanchez et al. |
| 2020/0201905 | A1* | 6/2020 | Kaufman ............... G06F 16/907 |
| 2020/0363485 | A1* | 11/2020 | Sun ................ G01R 33/567 |
| 2020/0394275 | A1 | 12/2020 | Gecer Ulu et al. |
| 2021/0304847 | A1 | 9/2021 | Senior et al. |

FOREIGN PATENT DOCUMENTS

| | | |
|---|---|---|
| WO | 2017/094899 A1 | 6/2017 |
| WO | WO 2018/220368 A1 | 12/2018 |

OTHER PUBLICATIONS

Dong, Yuan, et al., "Inverse Structural Design of Graphene/Boron Nitride Hybrids by Regressional GAN," arxiv.org, Cornell University Library, Aug. 2019, XP081466951, 31 pages.

Nigam, AkshatKumar, et al., "Augmenting Genetic Algorithms with Deep Neural Networks for Exploring the Chemical Space," ICLR 2020, arxiv.org, 2020, XP081579685, 14 pages.

Schmidt, Jonathan, et al., "Recent advances and applications of machine learning in solid-state materials science," NPJ Computational Materials, Aug. 2019, XP055733799, 36 pages.

Yang, Zijiang, et al., "Microstructural Materials Design via Deep Adversarial Learning Methodology," arxiv.org, Cornell University Library, 2019, XP081015042, 34 pages.

EPO Extended Search Report dated Dec. 11, 2020, issued in European Patent Application No. 20179214.0 (12 pages).

Artur Kadurin, et al., druGAN: An Advanced Generative Adversarial Autoencoder Model for de Novo Generation of New Molecules with Desired Molecular Properties in Silico, Molecular Pharmaceutics, 2017, pp. 3098-3104, vol. 14, ACS Publishing, U.S.

Benjamin Sanchez-Lengeling, et al., Inverse molecular design using machine learning: Generative models for matter engineering, Science, 2018, pp. 360-365, vol. 361, The American Association for the Advancement of Science, U.S.

Benjamin Sanchez-Lengeling, et al., Optimizing distributions over molecular space. An Objective-Reinforced Generative Adversarial Network for Inverse-design Chemistry (ORGANIC), 2017, pp. 1-18, ChemRxiv, U.S. Website: https://chemrxiv.org/articles/ORGANIC_1_pdf/5309668/3.

Geun Ho Gu, et al., Machine learning for renewable energy materials, Journal of Materials Chemistry A, Aug. 7, 2019, pp. 17096-17117, vol. 7, No. 29, The Royal Society of Chemistry, U.K.

Keith T. Butler et al., "Machine Learning For Molecular And Materials Science", https://doi.org/10.1038/s41586-018-0337-2, pp. 547-555, Jul. 25, 2018.

Lin-Wang Wang, A special purpose computer for ab initio molecular dynamics simulations, Aug. 18, 2008, 30 Pages, Lawrence Berkeley National Laboratory, U.S. Website: https://escholarship.org/uc/item/2874t8zr.

Oleksii Prykhodko et al., "A De Novo Molecular Generation Method Using Latent Vector Based Generative Adversarial Network", Hit Discovery, Discovery Sciences, Biopharmaceutical R&D, AstraZeneca, & Department of Computer Science and Engineering, Gothenburg, Sweden, 27 pgs, Jun. 20, 2019.

Rafael Gómez-Bombarelli, et al., Automatic Chemical Design Using a Data-Driven Continuous Representation of Molecules, 2017, pp. 1-26, U.S.

Xiaolin Li et al., "A Deep Adversarial Learning Methodology For Designing Microstructural Material Systems", Proceedings of the ASME 2018 International Design Engineering Technical Conferences & Computers and Information in Engineering Conference IDETC/CIE, Aug. 26-29, 2018, 14pgs., Quebec City, Canada.

Zhaocheng Liu, et al., A Generative Model for Inverse Design of Metamaterials, 2018, pp. 1-15, Cornell University, U.S. Website: https://arxiv.org/abs/1805.10181.

U.S. Notice of Allowance dated May 18, 2022, issued in U.S. Appl. No. 16/799,410 (11 pages).

U.S. Notice of Allowance dated Aug. 29, 2022, issued in U.S. Appl. No. 16/799,410 (12 pages).

* cited by examiner

ELECTRONIC AND ATOMIC STRUCTURE COMPUTATION UTILIZING MACHINE LEARNING

CROSS-REFERENCE TO RELATED APPLICATION

The present application claims priority to and the benefit of U.S. Provisional Application No. 62/902,324, entitled "SEMICONDUCTOR DEVICE AND METHOD OF MAKING THE SAME", filed on Sep. 18, 2019, the entire content of which is incorporated herein by reference.

The present application is related to U.S. patent application Ser. No. 16/799,410, entitled "GENERATIVE STRUCTURE-PROPERTY INVERSE COMPUTATIONAL CO-DESIGN OF MATERIALS" filed on Feb. 24, 2020, which claims priority to and the benefit of U.S. Provisional Application No. 62/909,648, entitled "GENERATIVE STRUCTURE-PROPERTY INVERSE COMPUTATIONAL CO-DESIGN OF MATERIALS", filed on Oct. 2, 2019, the entire contents of both of which are incorporated herein by reference.

FIELD

The present disclosure relates to systems and methods for electronic and atomic structure computation utilizing machine learning.

BACKGROUND

First principles calculations have been utilized to predict characteristics of a material without actual measurements and related experiments. Density Functional Theory (DFT), for instance, may be utilized to predict electronic and structural properties of materials ab-initio, i.e., from first principles. However, such theoretical predictions have not been utilized widely for logic technology to compute electronic structure and/or properties. A key stumbling block is the so-called "system-size scaling bottleneck" in electronic structure methods, which is utilized to predict electronic and atomic properties of interest.

In particular, the requirement for self-consistency is quite time consuming because it entails the solution of Poisson's equation for the charge in the system in multiple iterations. In fact, the process of iteration to charge self-consistency may be the most time consuming part of DFT calculations. Specifically, Density Functional Theory computational complexity scales as a function of $O(N^3)$ where N is the number of atoms in the system. As such, the practical size of realistic logic systems and potentially useful material configurations may be outside the scope that DFT can scalably handle. That is, DFT simulations are currently difficult to run on model systems at the size of logic circuits or major subcomponents due to the computational complexity of their calculations. This is unsatisfactory and often critically limiting from a materials discovery and design perspective.

As such, there remains a need to improve the process of material discovery for logic systems utilizing DFT calculations.

The above information in the Background section is only for enhancement of understanding of the technological area that the present disclosure aims to address, and therefore it should not be construed as admission of existence or relevancy of the prior art.

SUMMARY

An aspect according to one or more embodiments of the present disclosure is directed toward systems and methods for electronic and atomic structure computation utilizing machine learning.

An aspect according to one or more embodiments of the present disclosure is directed toward supervised and semi-supervised methods to scale time complexity of electronic and atomic structure calculations.

According to one or more embodiments of the present disclosure, a method to obtain learned self-consistent electron density and/or a derived physical quantity thereof includes: conducting non-self-consistent (NSC) calculation to generate a first NSC dataset X1 from a first plurality of configurations of atoms; conducting self-consistent (SC) calculation to generate a first SC dataset Y1 from the first plurality of configurations of atoms; mapping the first NSC dataset X1 to the first SC dataset Y1 utilizing a machine learning architecture to generate a mapping function F; conducting NSC calculation to generate a new NSC data X2 from a second configuration of atoms, and transforming the new NSC data X2 to a learned self-consistent data Y2 utilizing the mapping function F.

In an embodiment, the conducting of the non-self-consistent (NSC) calculation to generate the first NSC dataset X1 from the first plurality of configurations of atoms includes: a) selecting a first configuration of atoms from among the first plurality of configurations of atoms; b) solving a Schrodinger's equation utilizing an initial input potential for the first configuration of atoms to obtain a wave function; c) calculating an electron density from the wave function; d) saving the electron density for the first configuration of atoms; and e) performing act a to act d above for each remaining configuration of atoms, wherein the conducting of the non-self-consistent (NSC) calculation does not include iterating act b and act c.

In an embodiment, the mapping is conducted utilizing a generative adversarial network (GAN) or a deep convolutional neural network (DNN).

In an embodiment, the generating of the learned self-consistent data Y2 from the new NSC data X2 utilizing the mapping function F does not include iterating to self-consistency by utilizing a Schrodinger-Poisson technique.

In an embodiment, the conducting of the non-self-consistent (NSC) calculation to generate the first NSC dataset X1 and the conducting of the self-consistent (SC) calculation to generate the first SC dataset Y1 each utilizes Density Functional Theory (DFT) or Semi-Empirical Tight Binding (TB).

In an embodiment, the machine learning architecture utilizes a deep neural network architecture.

In an embodiment, the deep neural network architecture includes one or more intermediate layers selected from convolutional layers for down sampling, max pooling layer, average pooling layer, and convolutional layers with strides for up sampling.

In an embodiment, the deep neural network architecture includes one or more intermediate layers selected from Dropout, L1 regularization, L2 regularization, and cross validation.

In an embodiment, the derived physical quantity includes electronic transmission, density of states, and/or electronic band structure.

In an embodiment, the first NSC dataset X1 includes NSC electronic transmission probabilities and the first SC dataset Y1 includes SC electronic transmission probabilities, both in ideal media with no scattering, the machine learning algorithm includes a loss function, and the loss function is derived from a Poisson distribution or from a Negative Binomial distribution.

In an embodiment, the first NSC dataset X1 and the first SC dataset Y1 are each electronic transmission probabilities, and the mapping of the first NSC dataset X1 to the first SC dataset Y1 utilizing the machine learning architecture to generate the mapping function F includes obtaining a joint probability distribution p(X, Y) utilizing a semi-supervised learning framework selected from a generative adversarial network (GAN) and a variational autoencoder (VAE).

In an embodiment, the GAN is selected from a PixelGAN, a CycleGAN and an InfoGAN.

In an embodiment, the first NSC dataset X1 and the first SC dataset Y1 are each electronic band structures for mono-atomic, binary, ternary and/or quaternary materials.

In an embodiment, the first NSC dataset X1 and the first SC dataset Y1 are each transmission probabilities through interface structures of A/B or A/B/C, and A, B and C are each materials the same as one another or different from one another.

In an embodiment, the first NSC dataset X1 and the first SC dataset Y1 are each atomic forces and/or phonon related quantities selected from phonon band structures and phononic transmissions.

In an embodiment, the first NSC dataset X1 and the first SC dataset Y1 are each densities of allowed electronic levels in materials.

In an embodiment, the first NSC dataset X1 and the first SC dataset Y1 each include more than one kind of physical quantities.

According to one or more embodiments of the present disclosure, a system to obtaining learned self-consistent electron density and/or a derived physical quantity includes: a first computing model configured to conduct non-self-consistent (NSC) calculation to generate a first NSC dataset X1 from a first plurality of configurations of atoms; a second computing model configured to conduct self-consistent (SC) calculation to generate a first SC dataset Y1 from the first plurality of configurations of atoms; and a machine learning architecture configured to map the first NSC dataset X1 to the first SC dataset Y1 through a mapping function F; and to generate a learned self-consistent data Y2 from a new NSC data X2 utilizing the mapping function F.

In an embodiment, the generating of the learned self-consistent data Y2 from the new NSC data X2 utilizing the mapping function F does not include iterating to self-consistency by utilizing a Schrodinger-Poisson technique.

In an embodiment, the machine learning architecture is on a computing device including a graphics processing unit (GPU) or a field programmable gate array (FGPA).

This summary is provided to introduce a selection of features and concepts of embodiments of the present disclosure that are further described below in the detailed description. This summary is not intended to identify key or essential features of the claimed subject matter, nor is it intended to be utilized in limiting the scope of the claimed subject matter. One or more of the described features may be combined with one or more other described features to provide a workable device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
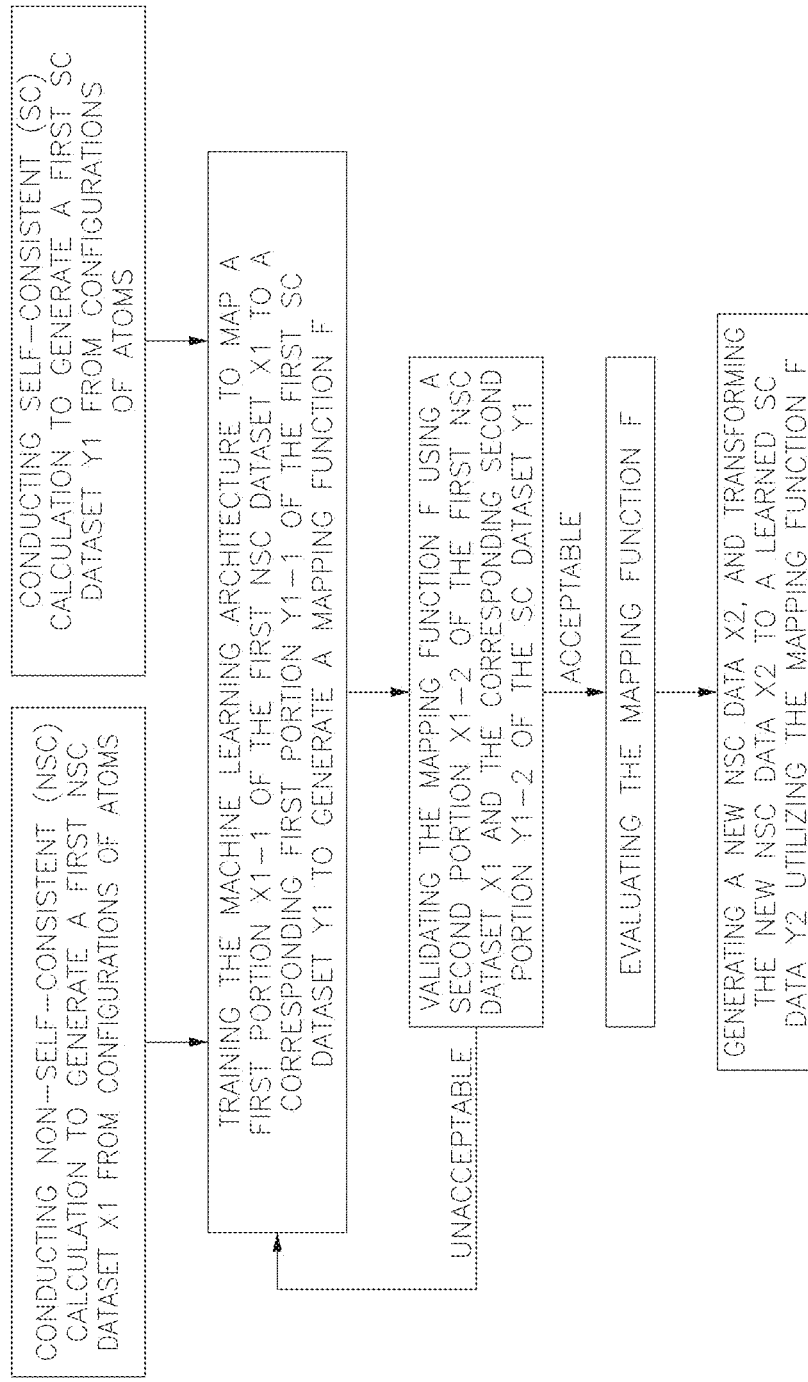
FIG. 1 is a schematic illustration of a method for atomic and electronic structure computation according to embodiments of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof.

The use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. The various components of these devices may be a process or thread, running on one or more processors, in one or more computing devices, executing computer program instructions and interacting with other system components for performing the various functionalities described herein. The computer program instructions are stored in a memory which may be implemented in a computing device utilizing a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

In predicting material properties utilizing first principles calculations, the electron density of a material of interest is first obtained through the following procedure: (1) the atomic species to be simulated and the geometric structure and placement of atoms in space are identified; (2) a potential grid is set-up based on the location of the atoms—the potentials can resemble atomic potentials or they can be "pseudo"—potentials that capture all the effects that real atomic potentials can have on electrons, without accounting explicitly for "core" electrons (electrons closest to the nucleus); (3) electronic "basis" functions are created—the basis can be "real space", where mathematical functions describing the amplitude of the electronic wave function in real space are utilized or "momentum/k-space"—where the electronic wave function is assumed to be a linear combination of plane waves in momentum space; (4) the Hamiltonian Matrix (H) describing the interaction of electronic basis functions with the potential in act (2) is created; and (5) the optimum combination of electronic basis functions for the given potential grid is obtained by solving an optimization problem for the Schrodinger Equation $H\Psi=E\Psi$ (where $\Psi$ is the electronic wave function and E are the eigenvalues of H) such that the combination of electronic basis functions results in a stable and self-consistent electron density and ground state of atoms.

In a DFT calculation, steps (acts) 1 through 5 above are repeated each time a new configuration of atoms is simulated. Due to the many iterations needed to achieve the self-consistency, this procedure produces reliable electron density for further calculation of the material properties, but is limited to only simple material systems due to the computational complexity. Embodiments of the present disclosure provide a method to generate learned (i.e., machined learned) self-consistent data without going through the self-consistent calculations.

According to one or more embodiments of the present disclosure, a method to obtain learned self-consistent electron density and/or a derived physical quantity thereof includes conducting non-self-consistent (NSC) calculation to generate a first NSC dataset X1 from a first plurality of configurations of atoms; conducting self-consistent (SC) calculation to generate a first SC dataset Y1 from the first plurality of configurations of atoms; mapping the first NSC dataset X1 to the first SC dataset Y1 utilizing a machine learning architecture to generate a mapping function F; conducting NSC calculation to generate a new NSC data X2 from a second configuration of atoms; and transforming the new NSC data X2 to a learned self-consistent data Y2 utilizing the mapping function F.

The method according to embodiments of the present disclosure may circumvent the iteration process in atomic and electronic structure calculations to significantly reduce the time required to obtain the self-consistent electron density for a target system, and/or significantly scale down the time required to compute derived quantities such as electronic transmission, electronic charges on atoms, forces on atoms, etc.

FIG. 1 is a schematic illustration of a method for material structure (and/or derived properties thereof) computation according to some embodiments of the present disclosure. The material structure may include atomic structure and/or electronic structure, which may be represented by the electron density. Referring to FIG. 1, a method for obtaining learned self-consistent electron density and/or derived physical quantities includes: conducting non-self-consistent (NSC) calculation to generate a first NSC dataset X1 from configurations (e.g., a first plurality of configurations or possible configurations) of atoms; and conducting self-consistent (SC) calculations to generate a first SC dataset Y1 from the same configurations of atoms.

The first NSC dataset X1 includes data corresponding to non-self-consistent (NSC) electron density and/or properties derived from the NSC electron density. The first SC dataset Y1 includes data corresponding to self-consistent (SC) counterparts of the first NSC dataset X1. That is, the first SC dataset Y1 includes data corresponding to self-consistent (SC) electron density and/or properties derived from the SC electron density. Both the first NSC dataset X1 and the first SC dataset Y1 were obtained utilizing the same list (e.g., same set) of configurations of atoms (that is, by inputting the same configurations of atoms in the computation), except that non-self-consistent (NSC) calculation is utilized in generating the first NSC dataset X1 while self-consistent (SC) calculation is utilized in generating the first SC dataset Y1. Each of the first NSC dataset X1 and the first SC dataset Y1 may be obtained utilizing a respective computing model (simulation program).

The properties derived from the non-self-consistent electron density (i.e., the derived physical quantities) may include non-self-consistent electronic transmission, density of states, electronic band structure, phononic transmission, etc. The properties derived from the self-consistent electron density may include self-consistent electronic transmission, density of states, electronic band structure, phononic transmission, etc.

In conducting the non-self-consistent (NSC) calculation to generate the first NSC dataset X1 and in conducting the self-consistent (SC) calculation to generate the first SC dataset Y1, any suitable electronic structure technique may be utilized. In one embodiment, each of the NSC calculation and the SC calculation utilizes Density Functional Theory (DFT), Semi-Empirical Tight Binding (TB), etc.

Figure 2:
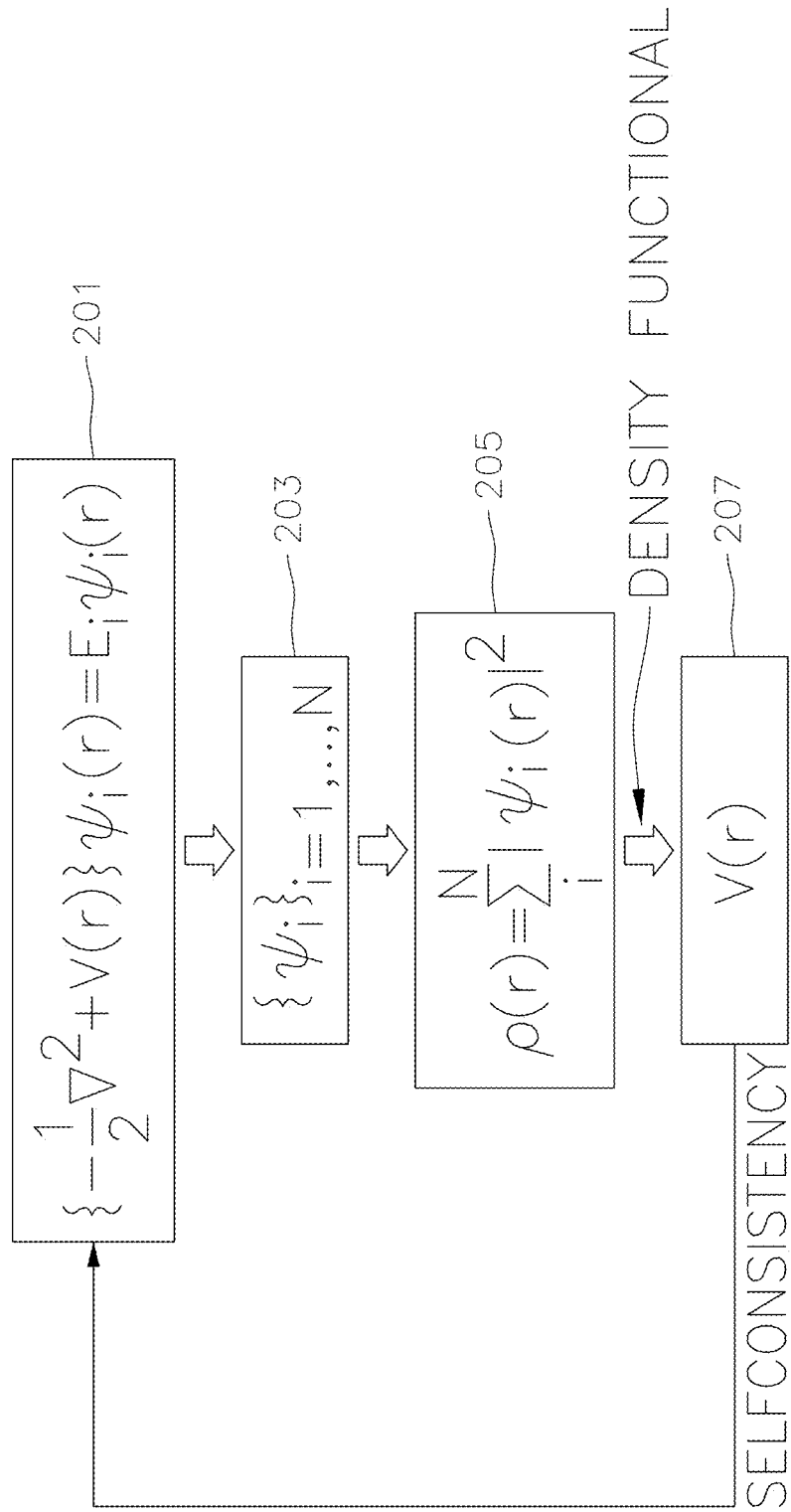
FIG. 2 is a schematic illustration of computational steps (acts) in a self-consistent calculation.

The computational steps (acts) in a self-consistent calculation utilizing DFT according to one embodiment are illustrated in FIG. 2. Referring to FIG. 2, the Schrodinger's equation in act 201 is solved for a given initial input potential V(r) to provide the wave functions {Ψi} for 1 to N electrons in act 203, then the electron density ρ(r) is calculated from the wave functions according to the equation in act 205, and a density function (e.g., the local density approximation formula) is utilized to calculate the output potential V(r). This output potential is mixed with previous potentials to generate the input potential show in act 207, and utilized to solve the Schrodinger's equation for the next round of iteration starting from act 201 again. The iteration continues until self-consistency is reached, which means the input potential used in act 201 is the same as (i.e., consistent with) the output potential obtained in act 207. This method including repeated calculations from act 201 to act 207 to achieve the self-consistency is referred to as the Schrodinger-Poisson technique. The electron density ρ(r) obtained when self-consistency is reached is referred to as the self-consistent electron density.

Upon convergence (reaching self-consistency), the electron density in DFT can be utilized to derive useful properties of interest for a system, such as the electronic band structure, electronic transmission probability, the electronic charges on atoms, the forces on atoms, total energy of the system, etc. The calculation of these properties may also be time consuming when self-consistency is required in their respective calculations. For instance, computing the electronic transmission from a self-consistent DFT calculation also scales as the function of $O(N^{\wedge}3)$.

Throughout the present disclosure, the term "self-consistent" electron density refers to a first value for the electron density that if utilized in calculating the output potential V(r), which is then utilized to go through act 207, 201, 203 and 205 illustrated in FIG. 2 in the stated sequence to generate a second electron density, the second electron density would have the same value as the first electron density.

Throughout the current disclosure, the term "learned self-consistent electron density" or "learned SC density" refers to data having the self-consistent quality (i.e., if the learned electron density is utilized to calculate the output potential V(r) in act 207 of FIG. 2, which is then utilized to go through act 201, 203 and 205 once to generate a second electron density, the second electron density would have the same value as the learned electron density), but the learned electron density is generated from the NSC data utilizing the mapping function F according to one or more embodiments of the present disclosure. The term "learned SC data" refers to a data (e.g., electron density, a derived quantity, etc.) having the self-consistent quality as described above, but is generated from an NSC data utilizing the mapping function F. In other words, the learned SC data was not obtained through the iterative self-consistent calculations.

For electronic structure methods that are not DFT (such as Tight Binding (TB)), the process followed is substantially the same as the self-consistent DFT described above, if charge self-consistency is desired. This feature is especially relevant in such applications as logic field-effect transistor (FET) modeling utilizing atomistic techniques, where a potential is applied at the gate of the FET and TB calculations are iterated until self-consistency is achieved.

Figure 3:
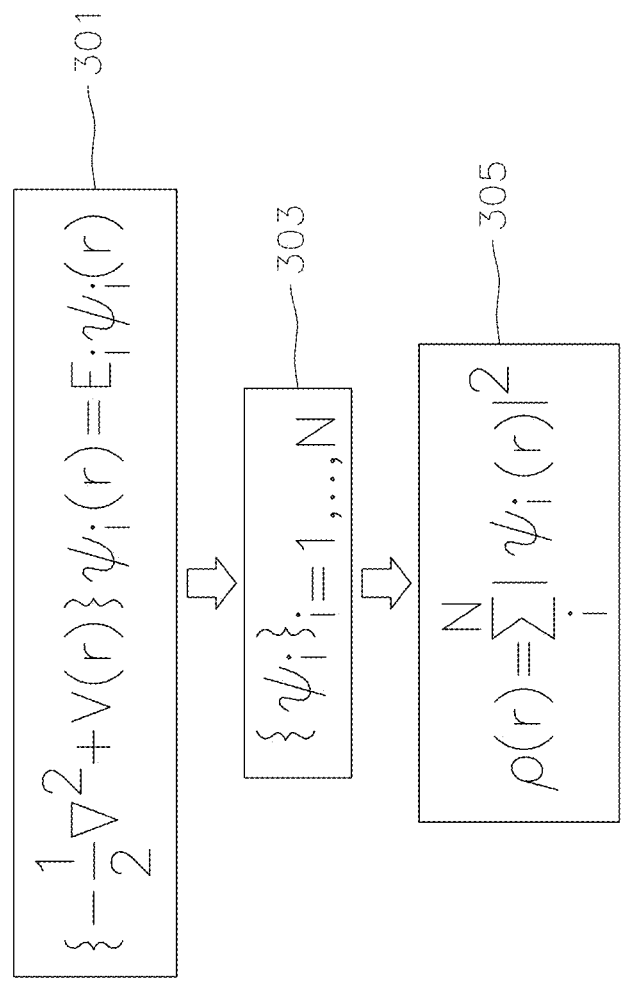
FIG. 3 is schematic illustration of computational steps (acts) in a non-self-consistent calculation.

The computational steps (acts) in a non-self-consistent calculation are illustrated in FIG. 3. Referring to FIG. 3, the Schrodinger's equation in act 301 is solved for a given input potential V(r) to provide the wave functions {Ψi} for 1 to N electrons in act 303. The electron density ρ(r) is then calculated from the wave functions according to the equation in act 205. This is the end of the NSC calculation and no iteration is performed. The obtained electron density ρ(r) can then be utilized to calculate the NSC derived properties. The NSC calculations can be utilized to generate the first NSC dataset X1 for the machine learning process, or to provide the new NSC data X2 in the generating process.

In both the NSC calculations and the SC calculations, the input potential for the NSC calculation and the initial input potential for the SC calculation may represent atomic potential of neutral atoms, and may be obtained based on the atomic positions, atomic number for each species, and a potential grid that is set-up based on the location of the atoms. This input potential may resemble atomic potentials or may be "pseudo"—potentials that capture all the effects that real atomic potentials can have on electrons, without accounting explicitly for "core" electrons (electrons closest to the nucleus).

Comparing with the self-consistent calculation illustrated in FIG. 2, the non-self-consistent calculation does not include steps (acts) of calculating the output potential V(r) from the obtained density function, mixing the output potential with previous potentials to generate the input potential shown in act 107 for the next self-consistent iteration starting from act 101 again, and repeating the calculations until the self-consistency is reached. As such, the non-self-consistent calculation takes much less computing time than the self-consistent calculation.

Any suitable computing device, such as a computer, a laptop, etc., may be programmed to perform the self-consistent calculation and the non-self-consistent calculation above. That is, after installing the self-consistent calculation program (or model) and the non-self-consistent calculation program (or model) on the computing device, and after inputting the configurations of electrons and/or atoms, the computing device will automatically complete the self-consistent calculations and the non-self-consistent calculations. Both the self-consistent calculations and the non-self-consistent calculations may be performed in the same computing device, or in separate devices.

The first NSC dataset X1 and the first SC dataset Y1 may each include a plurality of data points. For example, the first NSC dataset X1 and the first SC dataset Y1 may each be generated based on 100 or more, 1000 or more, or 10,000 or more different configurations of electronic structures and/or atomic structures.

Data contained in the first NSC dataset X1 and the first SC dataset Y1 may be split into a first portion (also referred to as the training set) for training the machine learning architecture to obtain a model (e.g., a mapping function F for mapping the first NSC dataset X1 to the first SC dataset Y1), and a second portion (also referred to as the test set) for validating the mapping function F obtained from the training process. However, embodiments of the present disclosure are not limited thereto, and the first portion and the second portion may be generated independently (e.g., in different processes or at different times). The data included in each portion of the first NSC dataset X1 and the data included in the corresponding portion of the first SC dataset Y1 are generated based on the same configurations of electrons and/or atoms.

A ratio between the first portion and the second portion may be any suitable value that provides sufficient data points for each of the training process and the validation process. For example, a ratio between the first portion and the second portion may be 60:40, 70:30, 80:20, or 90:10. However, embodiments of the present disclosure are not limited thereto.

The method may further include training the machine learning architecture to generate a mapping function F that maps the first portion of the first NSC dataset X1 to the corresponding first portion of the first SC dataset Y1, validating the mapping function F and evaluating the mapping function F. The training process, the validation process and the evaluation process together are referred to as the learning process. The term "machine learning architecture" as used herein refers to the components of the machine learning process (e.g., neural networks), the matrix utilized, the fitting models, data collection and splitting, the algorithms utilized in the machine learning process, etc.

Here, the first portion of the first NSC dataset X1 and the corresponding first portion of the first SC dataset Y1 are utilized to train the machine learning architecture to obtain the mapping function F, such that at the end of the training process, the machine learning architecture will learn a mapping function F that can transform a data from the first NSC dataset X1 into a data that is indistinguishable from data included in the first SC dataset Y1.

During the training process, only the first portion of the first NSC dataset X1 and the first portion of the first SC dataset Y1 are utilized. The machine learning architecture selects parameters, e.g., weights and biases in the case of Neural Network, based on the first portion of the data and generates a model that transforms the first NSC dataset X1 to the first SC dataset Y1.

During the validation process, the second portion (the test set) of the first NSC dataset X1 and the corresponding second portion of the first SC dataset Y1 are utilized to provide an unbiased evaluation of the accuracy of the model. That is, the second portion of the first NSC dataset X1 are transformed utilizing the model generated in the training process and the transformed data is compared with the corresponding second portion of the first SC dataset Y1. When the result does not meet a set or preterminal evaluation criteria, the model parameters are adjusted through calculating the loss (i.e. error rate, or loss function) to improve the fitting accuracy. Depending on the machine learning algorithm, the evaluation criteria may be based on F1 score, mean squared error (MSE), root mean squared error (RMSE), etc. When the result meets the set or predetermined evaluation criteria, no further adjustment is made. A final model, i.e., mapping function F is obtained at the end of the validation process.

During the evaluation process, the performance of the machine learning architecture is tested. The first NSC dataset X1 and the corresponding first SC dataset Y1 are each split into subsets (e.g., randomly) according to various suitable procedures, such as K-Fold cross validation, repeated random sub-sampling, etc. Cross-validation is also referred to as rotation estimation or out-of-sample testing. It includes any of various similar model validation techniques for assessing how the results of a statistical analysis will generalize to an independent data set. One round of cross-validation involves partitioning a sample of data into complementary subsets, performing the analysis on one subset (called the training set), and validating the analysis on the other subset (called the validation set or testing set). To reduce variability, in most methods multiple rounds of cross-validation are performed utilizing different partitions, and the validation results are combined (e.g. averaged) over the rounds to give an estimate of the model's predictive performance. Through this process, how accurate the model is on multiple and different subsets of data is evaluated.

Once the mapping function F is deemed satisfactory, the method may further include generating (producing, or obtaining) learned self-consistent data utilizing the mapping function F, i.e., the generating process. Here, a new NSC data X2 may be generated through non-self-consistent (NSC) calculation for a configuration of interest, such as a configuration of electronic structure and/or atomic structure, and a corresponding new learned self-consistent data Y2 may be generated utilizing the mapping function F without going through the self-consistent calculation process. That is, the new learned self-consistent data Y2 is generated through transformation of the new NSC data X2 utilizing the mapping function F.

According to embodiments of the present disclosure, the method for atomic and electronic structure computation includes a learning process and a generating process. At the end of the learning process (e.g., including the training process, validation process and evaluation process), the mapping function F from the first NSC dataset X1 to the first SC dataset Y1 is learned utilizing supervised or semi-supervised machine learning algorithms. Then in the generating process after the learning process, the mapping function F is utilized to generate (produce or obtain) new learned SC values (e.g., generated from the machine learning architecture with the quality of self-consistent electron density and/or derived physical properties) from new NSC values (unseen by the learning algorithm) in orders of magnitude lesser time compared with when the self-consistent calculation is utilized to obtain the new SC values.

Figure 4A:
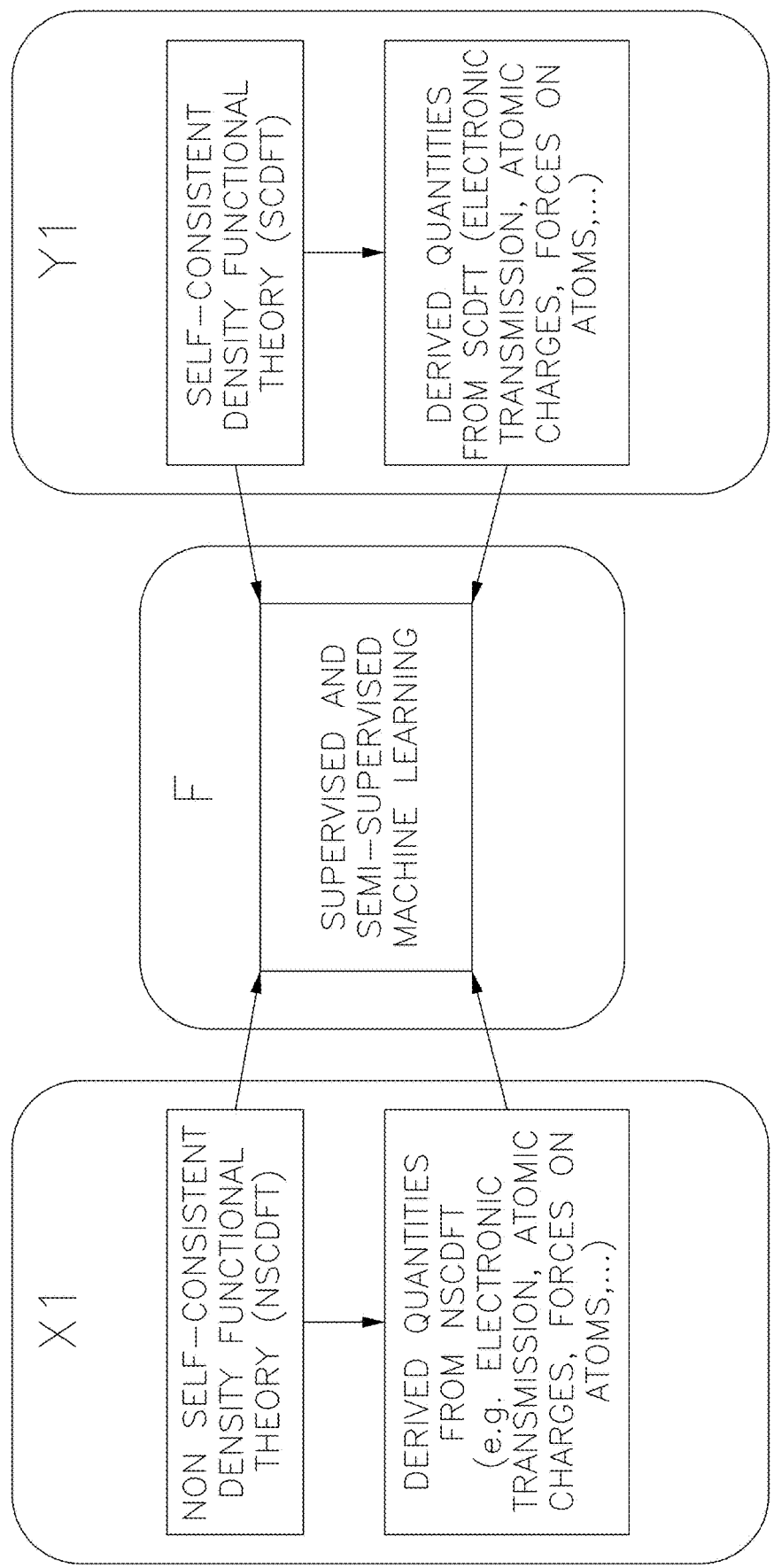
FIGS. 4A-4B schematically illustrate a method of scaling down the time complexity of DFT calculations according to an embodiment of the present disclosure.
Figure 4B:
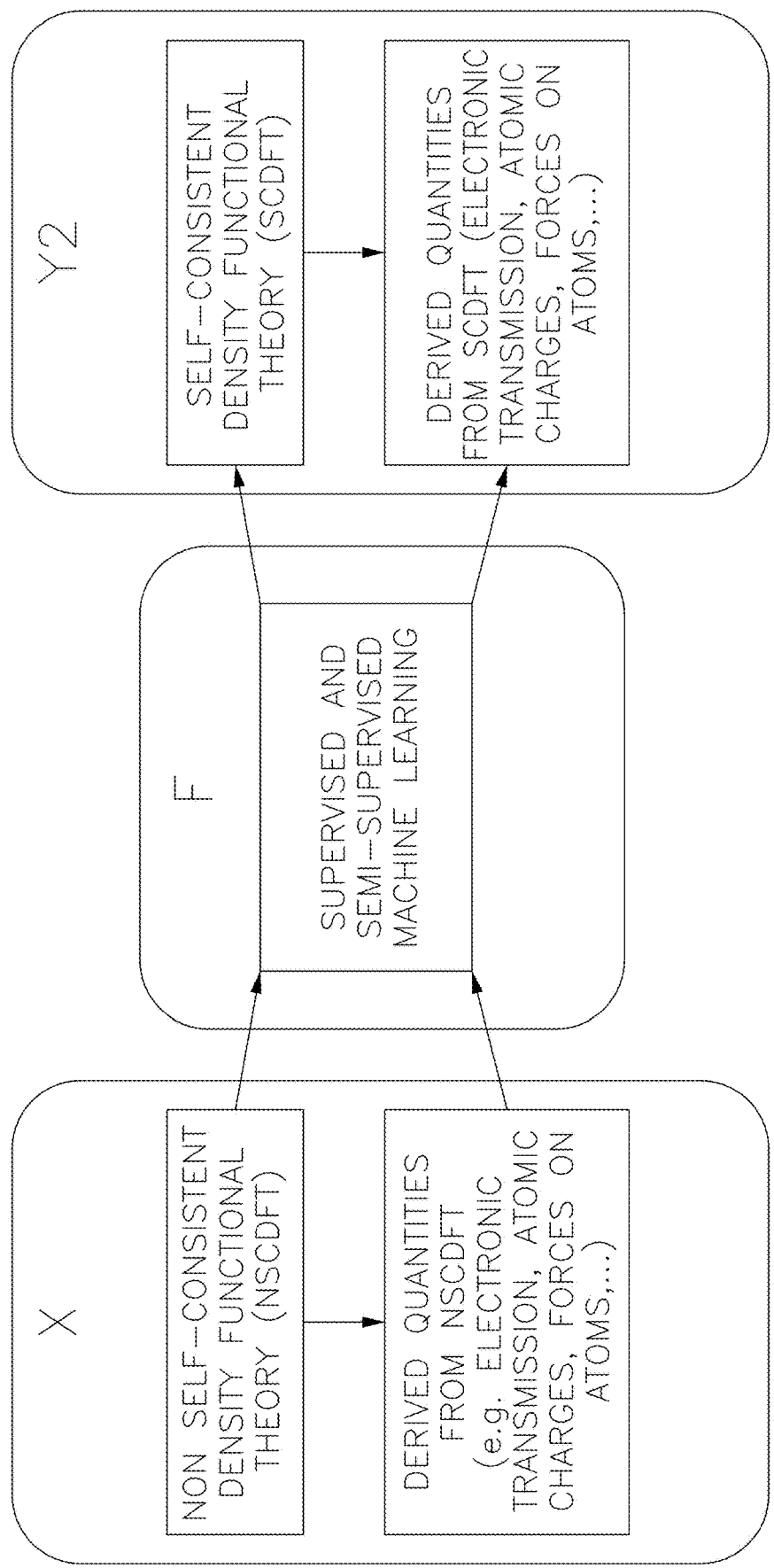

A schematic of the present disclosure as applied to scaling down the time complexity of DFT calculations is illustrated in FIGS. 4A-4B. Referring to FIG. 4A, the first NSC dataset X1 includes electron density obtained from non-self-consistent Density Functional Theory (NSCDFT) calculation (hereinafter, NSCDFT electron density), and/or derived quantities from the NSCDFT electron density, such as electronic transmission, atomic charges, forces on atoms, etc. The first SC dataset Y1 includes electron density obtained from self-consistent Density Functional Theory (SCDFT) (hereinafter, SCDFT electron density) calculation, and/or derived quantities from the SCDFT electron density, such as electronic transmission, atomic charges, forces on atoms, etc. The first NSC dataset X1 and the first SC dataset Y1 correspond to each other with the same number of electron densities and derived quantities based on the same (set of) configurations of electrons and/or atoms. Any data in the first NSC dataset X1 has a counterpart in the first SC dataset Y1. In the learning process illustrated in FIG. 4A, data from the first NSC dataset X1 and the first SC dataset Y1 are utilized as input for the machine learning architecture, at the end of which, a mapping function F that can satisfactorily transform the data from the first NSC dataset X1 into data in the first SC dataset Y1 is learned.

In the generating process illustrated in FIG. 4B, new NSC data X2 including electron density and/or derived quantities based on an electron structure and/or atom structure of interest is obtained from NSCDFT calculation. The new NSC data X2 is then transformed to new learned self-consistent data Y2 through the mapping function F. The process can be applied to obtain learned SC data for a large number of electron structures and/or atom structures.

Because NSCDFT converges in time of several orders of magnitude less than SCDFT, and obtaining the outputs from inputs to the mapping function may be a matrix multiplication that can be greatly accelerated utilizing suitable computing hardware, such as graphics processing units (GPUs), field programmable gate arrays (FPGAs), etc., significant time savings can be achieved in the methods according embodiments of the present disclosure compared to the related art technique of performing SCDFT calculations and deriving physical quantities from it.

According to some embodiments, the machine learning architecture may utilize a generative adversarial network (GAN), a deep convolutional neural network (DNN), or equivalent statistical learning algorithms that can take NSCDFT as the inputs and perform a succession of matrix-multiplications to form the outputs of learned SC electron density and/or SC electron density derived properties.

During the machine learning process, a loss function may be generated to modify the mapping function based on differences between data in the first SC dataset Y1 and data from the first NSC dataset X1 that has been transformed by the mapping function. The mapping function may be continuously modified until the machine learning architecture is not able to distinguish between the transformed first NSC dataset and the first SC dataset. That last mapping function is then utilized in the generating stage to transform new NSC data into learned SC data.

The term "function" as used herein may refer to 1) a parametric model that gives an output y for every input x (e.g., a mathematical function, the loss function), or 2) a parametric neural-network where the "function" (e.g., mapping function) being learned is the composition of weights of the neurons.

Figure 5B:
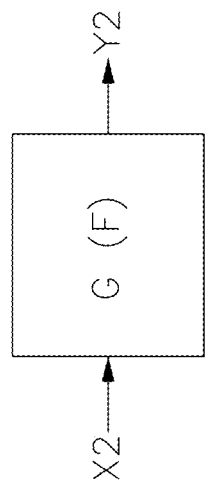
FIGS. 5A-5B schematically illustrate a machine learning process utilizing a generative adversarial network (GAN).
Figure 5A:
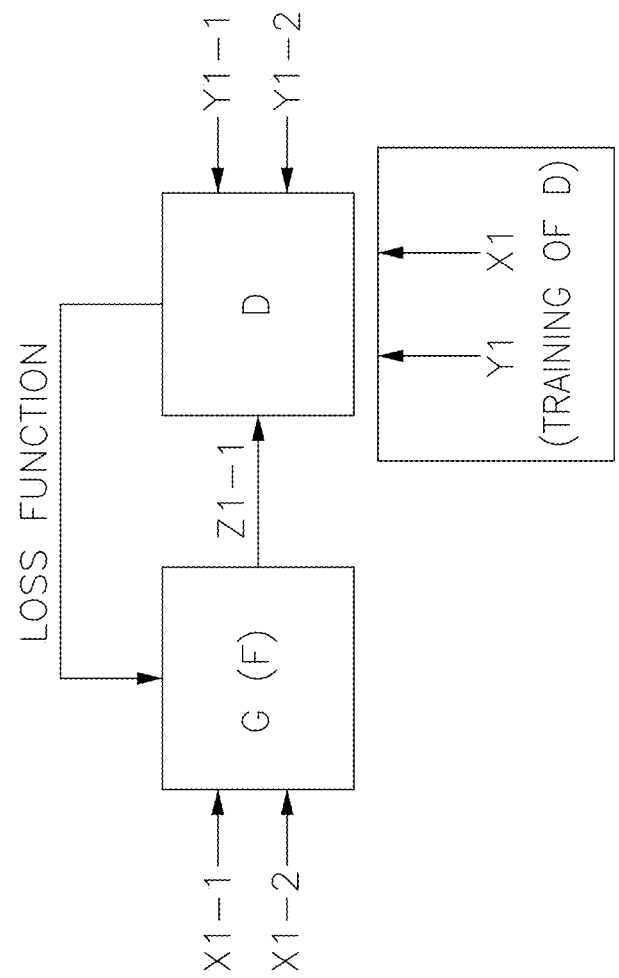

According to one or more embodiments, the machine learning architecture may utilize a generative adversarial network (GAN). FIGS. 5A-5B schematically illustrate a machine learning process utilizing a generative adversarial network (GAN). Referring to FIG. 5A, the machine learning architecture includes a generator network (G) and a discriminator network (D). The discriminator network (D) first learns which data from the first NSC dataset X1 (including the first portion X1-1 and the second portion X1-2) corresponds to which data from the first SC dataset Y1 (including the first portion Y1-1 and the second portion Y1-2). Hence, the discriminator network (D) has input from both the first NSC dataset X1 and the first SC dataset Y1 during the discriminator training process.

To train the generator network (G), an NSC input (X1-1) is utilized to generate a predicted Z1-1 through an initial model (an initial mapping function). The predicted Z1-1 is fed into the trained discriminator network (D). If the discriminator network (D) can tell the difference between the predicted Z1-1 and the actual Y1-1 that it has been trained to associate with X1-1, it will "reject" the prediction and send feedback to the generator network (G) in the form of a loss function. The generator network (G) adjusts, e.g., the weights and biases based on the loss function to modify the model so that the predicted Z1-1 becomes closer to the actual Y1-1.

The training is repeated across many data samples. In the end, the generator network (G) will produce predictions (Z1-1) that are indistinguishable from the real results (Y1-1). Then the model is further adjusted from the validation process utilizing another dataset (e.g., the second portion X1-2 of the first NSC dataset X1 and the second portion Y1-2 of the first SC dataset Y1) that haven't been seen by the GAN, and further tested utilizing cross validation techniques. As shown in FIG. 4B, when the model is regarded satisfactory, the learning process is over and the system (e.g., the GAN, the model or the mapping function) can be utilized to generate (produce) new learned SC data. In this generation process, a new NSC data X2 can be obtained through the NSC calculation, then fed into the generator network (G), and the output Y2 of the generator network (G) may be accepted as data having the self-consistent quality, and utilized for further material property simulations.

In one embodiment, the GAN may be one of the following GAN architectures suitable for one-to-one translation of data, e.g., electron transmission probabilities, from the first NSC dataset X1 to the first SC dataset Y1, such as Pixel-GAN, cycle-consistent adversarial networks (CycleGAN) and information maximizing generative adversarial networks (InfoGAN). However, embodiments of the present disclosure are not limited thereto and any suitable GANs may be utilized.

According to one or more embodiments, the machine learning architecture (algorithm) utilized to generate the mapping function F may be based on deep learning architectures, which are useful when large amounts of data representing the underlying distribution is available. The method may utilize a deep neural network (DNN) or a deep convolutional neural network (CNN) based learning architecture that can handle a large amount of non-linearity in mapping from inputs (NSC calculations and derived quantities) to outputs (SC calculations and derived quantities).

A deep neural network is an artificial neural network with multiple layers between the input and output layers. It finds the correct mathematical manipulation to turn the input into the output, whether it be a linear relationship or a non-linear relationship. The network moves through the layers calculating the probability of each output. At first, the DNN creates a map of virtual neurons and assigns random numerical values, or "weights", to connections between them. The weights and inputs are multiplied and return an output between 0 and 1. If the network did not accurately produce the desired output, an algorithm would adjust the weights. That way the algorithm can make certain parameters more influential, until it determines the correct mathematical manipulation to fully process the data.

According to embodiments of the present disclosure, the deep neural network architecture may involve intermediate layers such as convolutional layers for down sampling, max pooling layers, average pooling layers, and convolutional layers with strides for up sampling.

A convolutional layer in a convolutional neural network systematically applies filters to an input and creates output feature maps. In predicting material properties, some of the derived physical quantities, such as electron transmission, can be represented as images. The filter is moved across the image left to right, top to bottom, with a one-pixel column change on the horizontal movements, then a one-pixel row change on the vertical movements. The amount of movement between applications of the filter to the input image is referred to as the stride. The stride can be changed to adjust how the filter is applied to the image and, in turn, the size of the resulting feature map.

A pooling layer has the function to gradually reduce the spatial size of the representation to reduce the number of parameters and amount of the computation in the network, and also to control overfitting. The max pooling layer performs down-sampling by dividing the input into rectangular pooling regions, and computing the maximum of each region. The average pooling layer involves calculating the average for each region of the input.

The deep neural network architecture may further include intermediate layers such as Dropout, L1 and L2 regularization, cross validation, etc. These intermediate layers may provide regularization which makes slight modifications to the learning algorithm such that the model generalizes better, and therefore improve the accuracy and performance of the architecture.

Dropout is a method similar to bagging techniques. On each iteration, neurons on each layer are randomly shut down and are not utilized. This will force the neural network to spread out weights and not focus on specific neurons because it will never know which neurons will show up on each iteration. Therefore, it can be seen as training a different model on each iteration. Also, because some neurons are dropped on each iteration, this will lead to a smaller network which in turns means a simpler network.

L2 parameter regularization is also known as weight decay. This method shrinks all weights by the same proportion towards zero; however, it will never make any weight to be exactly zero. In contrast to L2 regularization, some weights will be actually zero in L1 parameter regularization. It shrinks all weights by the same amount by adding an L1 norm penalty to the objective function.

In one embodiment, the first NSC dataset X1 and first SC dataset Y1 may each be electronic transmission probabilities in ideal media with no scattering, and the loss function utilized to find the mapping function (F) may be derived from the Poisson distribution or from the Negative Binomial distribution.

Figure 6B:
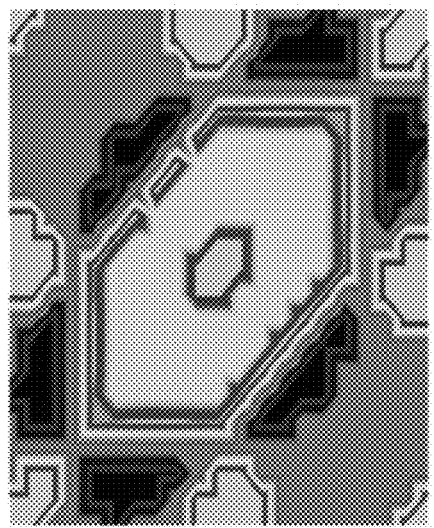
FIG. 6B is a transmission of Ru [0001] from self-consistent Density Functional Theory calculation.
Figure 6A:
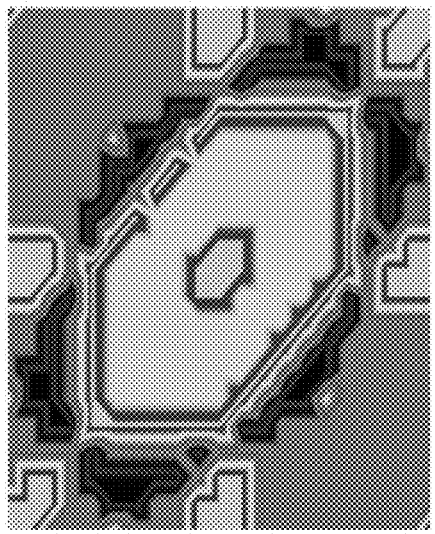
FIG. 6A is a transmission of Ru [0001] from non-self-consistent Density Functional Theory calculation.

FIG. 6A is an electronic transmission of ruthenium (Ru) [0001] from NSCDFT calculation, which took only 20 seconds to obtain. In obtaining the image shown in FIG. 6A, non-self-consistent calculation was conducted for Ru [001] to obtain the electron density. In more detail, the geometric structure and placement of atoms in space in a Ru [001] sample are first identified, and a potential grid (V(r)) is set-up based on the location of the atoms. Electronic basis functions are then created, followed by the creation of the Hamiltonian Matrix (H) describing the interaction of electronic basis functions with the potential grid. Then the Schrodinger's equation is solved based on the Hamiltonian Matrix (H) and the potential grid (V(r)), and the NSC electron density is obtained by following the procedure illustrated in FIG. 3. The NSC electron density is utilized to calculate the transmission spectrum of Rj [001] shown in FIG. 6A.

FIG. 6B is a transmission of Ru [0001] from SCDFT calculation, which took 8 minutes to obtain. In obtaining the image shown in FIG. 6B, self-consistent calculation was conducted for Ru [001] to obtain the electron density. In more detail, the geometric structure and placement of atoms in space in a Ru [001] sample are first identified, and a potential grid (V(r)) is set-up based on the location of the atoms. Electronic basis functions are then created, followed by the creation of the Hamiltonian Matrix (H) describing the interaction of electronic basis functions with the potential grid. Then the Schrodinger's equation is solved based on the Hamiltonian Matrix (H) and the potential grid (V(r)), and the NSC electron density is obtained by following the procedure illustrated in FIG. 2. That is, after repeated iterations of solving the Schrodinger's equation based on a newly obtained output potential V(r) from act 207, a stable and self-consistent (SC) electron density and ground state of atoms are obtained. The SC electron density is utilized to calculate the transmission spectrum of Rj [001] shown in FIG. 6B.

As evidenced by the processes of generating FIG. 6A and FIG. 6B, the NSCDFT calculations take much less computing time to complete than SCDFT calculations. According to embodiments of the present disclosure, the learned SC data can be obtained by transforming the NSC data through the machine learned model (e.g., the mapping function), therefore results such as the electronic transmission with the quality of a self-consistent data can be obtained at much less time than actually doing the self-consistent calculations.

According to embodiments of the present disclosure, by generating a first non-self-consistent dataset X1 and a first self-consistent counterpart Y1, and by mapping X1 to Y1 utilizing machine learning to obtain a mapping function F, only a limited number of self-consistent calculations need to be conducted to provide data in the learning process. After training is completed, a large number of learned self-consistent results can be obtained by transforming non-self-consistent data (obtained for material structures of interest) through the mapping function (F). This way, a large number of learned self-consistent results can be obtained without going through the iteration of a self-consistent calculation for each of the data point. Suitable new materials can be selected based on the learned self-consistent results.

Due to the mapping function F, the new NSC data, which is a non-self-consistent data, is transformed to the new learned SC data, which is a learned self-consistent data, and the transformation does not include iterating to self-consistency by utilizing the Schrodinger-Poisson technique. Without the self-consistent iterations, generating a new NSC data takes time of several orders of magnitude less than a counterpart self-consistent calculation, i.e., for the same atomic species with the same geometric structures and the same placement of atoms in space. As such, the generation of the learned self-consistent data takes much less computing time. Therefore, more learned self-consistent data can be generated without the time-consuming self-consistent iterations.

According to embodiments of the present disclosure, time consuming Poisson convergence procedure utilized in quantum mechanical electronic structure techniques may be bypassed in favor of learning a mapping function between non-self-consistent electron density and self-consistent electron density. Accordingly, methods according to embodiments of the present disclosure may achieve a time saving of several orders of magnitude for an equivalent full-band electronic structure calculation.

In one embodiment, the NSC dataset X1 and X2 and the SC dataset Y1 and Y2 are each electronic band structures for mono-atomic, binary, ternary and/or quaternary materials. For example, the material may be silicon (Si), germanium (Ge), copper (Cu), copper-silver (CuAg), gallium-arsenide (GaAs), gallium-arsenide-sulfur (GaAsS), etc.

In one embodiment, the NSC dataset X1 and X2 and the SC dataset Y1 and Y2 are each transmission probabilities through interface structures, such as A/B or A/B/C structures, where A, B and C are materials that may or may not be the same (e.g., identical). For example, the NSC dataset and the SC dataset may include transmission probabilities through a Cu-tantalum (Ta) interface, a Cu (100)—Cu (110) interface, the interface between different phases of tantalum nitride (TaN), etc.

In one embodiment, the NSC dataset X1 and X2 and the SC dataset Y1 and Y2 are each atomic forces and/or phonon related quantities such as the phonon band structure, phononic transmission, etc.

In one embodiment, the NSC dataset X1 and X2 and the SC dataset Y1 and Y2 are each densities of allowed electronic levels in materials.

In one embodiment, the NSC dataset X1 and X2 and the SC dataset Y1 and Y2 each include more than one type (kind) of physical quantities. For example, X1 and X2 may each simultaneously include electronic transmission and density of states, or phononic density of states and electronic density of states, etc.

In one or more embodiments, the machine learning architecture (algorithm) may utilize a supervised process described above. In the supervised process, each data in the first NSC dataset X1 has a corresponding data in the first SC dataset Y1.

In one embodiment, the first NSC dataset X1 and first SC dataset Y1 may each be electronic transmission probabilities, and the mapping function (F) from the first NSC dataset X1 to the first SC dataset Y1 may be derived utilizing one or more semi-supervised learning frameworks that approximate the joint probability distribution p(X1, Y1) utilizing generative adversarial networks (GAN) or variational autoencoders (VAE). The supervised machine learning utilizing GAN may be understood by referring to the descriptions above.

In the semi-supervised machine learning framework, both the first NSC dataset X1 and the first SC dataset Y1 are utilized in the training process, and instead of mapping the first NSC dataset X1 to the first SC dataset Y1, the model obtained provides the joint probability distribution p(X1, Y1). A new learned SC data Y2 can be generated from a new NSC data X2 based on the joint probability distribution p(X1, Y1).

In one embodiment, the semi-supervised machine learning is conducted utilizing variational autoencoders (VAEs). The first NSC dataset X1 is fed to the encoder, which compacts the input data and outputs latent space vectors, a probability distribution of latent space vectors, and mean and standard deviation associated with the probability distribution. The mean will control where the encoding of the input should be centered around while the standard deviation will control how much can the encoding vary from the mean. The decoder learns the latent space, the probability distribution, and the mean and standard deviation, and reconstructs the data to match the SC dataset Y1. The difference between the reconstructed data and the actual data in the SC dataset Y1 is utilized to adjust the modeling parameters. Once training is complete, the joint probability distribution of p(X1, Y1) is learned, and new learned SC data can be generated by utilizing new NSC data as an input and by sampling the latent space based on the joint probability distribution of p(X1, Y1).

While a DFT calculation has been illustrated, the present disclosure is not limited thereto. A method according to embodiments of the present disclosure may be utilized to generate self-consistent electronic structure parameters utilizing the non-self-consistent technique.

For example, the method according to embodiments of the present disclosure may be utilized when the baseline electronic structure technique is Pseudopotential-DFT, TB, Full-Electron Linearly Augmented Plane Wave (LAPW) DFT, or any other such technique that iterates to self-consistency and where this iteration is a significantly time consuming process.

In addition, the method may be applied simultaneously (or concurrently) to the prediction of self-consistent electronic density, which is a quantity of interest in electronic structure calculations, and to obtain derived quantities such as electronic transmission, without any change in the learning architecture.

Also, the method may be agnostic to the granular details of the electronic structure or atomic structure technique (such as grid density, basis sets utilized, etc.). The agnosticism arises from the fact that the learning process and its results do not depend on the specifics of the DFT tool/basis set utilized. It depends only on the accuracy of the learning process. A basis set in theoretical and computational chemistry is a set of functions (called basis functions) that is utilized to represent the electronic wave function in, e.g., the Hartree—Fock method or density-functional theory, in order to turn the partial differential equations of the model into algebraic equations suitable for efficient implementation on a computer. The method according to embodiments of the present disclosure can be applied as is for various suitable basis set, such as plane waves, localized atomic orbitals, augmented methods, flavor of DFT, etc.

According to embodiments of the present disclosure, supervised or semi-supervised machine learning techniques may be utilized to learn a statistically valid, accurate mapping function F from existing non-self-consistent electronic structure calculations (NSCDFT) to their counterpart self-consistent calculations (SCDFT) and/or SCDFT derived properties.

According to embodiments of the present disclosure, by bypassing the iteration to self-consistency in the generating stage, significant savings of computational time can be achieved. The time saved can then be put to use (usage) to simulate a larger space of possible atomic configurations and/or a larger subset of atomic species for a system of interest. In other words, by bypassing the requirement for iterating to self-consistency by utilizing Schrodinger-Poisson technique, the method according to embodiments of the present disclosure should significantly improve the prospects for materials discovery and design utilizing ab-initio DFT.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method to obtain learned self-consistent electron density and/or a derived physical quantity thereof, the method comprising:
    conducting non-self-consistent (NSC) calculation to generate a first NSC dataset X1 from a first plurality of configurations of atoms;
    conducting self-consistent (SC) calculation to generate a first SC dataset Y1 from the first plurality of configurations of atoms;
    mapping the first NSC dataset X1 to the first SC dataset Y1 utilizing a machine learning architecture to generate a mapping function F;
    conducting NSC calculation to generate a new NSC data X2 from a second configuration of atoms, and
    transforming the new NSC data X2 to a learned self-consistent data Y2 utilizing the mapping function F.

2. The method of claim 1, wherein the conducting of the non-self-consistent (NSC) calculation to generate the first NSC dataset X1 from the first plurality of configurations of atoms comprises:
    a) selecting a first configuration of atoms from among the first plurality of configurations of atoms;
    b) solving a Schrodinger's equation utilizing an initial input potential for the first configuration of atoms to obtain a wave function;
    c) calculating an electron density from the wave function;

d) saving the electron density for the first configuration of atoms; and
e) performing act a to act d above for each remaining configuration of atoms,
wherein the conducting of the non-self-consistent (NSC) calculation does not include iterating act b and act c.

3. The method of claim 1, wherein the mapping is conducted utilizing a generative adversarial network (GAN) or a deep convolutional neural network (DNN).

4. The method of claim 1, wherein the generating of the learned self-consistent data Y2 from the new NSC data X2 utilizing the mapping function F does not include iterating to self-consistency by utilizing a Schrodinger-Poisson technique.

5. The method of claim 1, wherein the conducting of the non-self-consistent (NSC) calculation to generate the first NSC dataset X1 and the conducting of the self-consistent (SC) calculation to generate the first SC dataset Y1 each utilizes Density Functional Theory (DFT) or Semi-Empirical Tight Binding (TB).

6. The method of claim 1, wherein the machine learning architecture utilizes a deep neural network architecture.

7. The method of claim 6, wherein the deep neural network architecture comprises one or more intermediate layers selected from convolutional layers for down sampling, max pooling layer, average pooling layer, and convolutional layers with strides for up sampling.

8. The method of claim 6, wherein the deep neural network architecture comprises one or more intermediate layers selected from Dropout, L1 regularization, L2 regularization, and cross validation.

9. The method of claim 1, wherein the derived physical quantity comprises electronic transmission, density of states, and/or electronic band structure.

10. The method of claim 1, wherein:
the first NSC dataset X1 comprises NSC electronic transmission probabilities and the first SC dataset Y1 comprises SC electronic transmission probabilities, both in ideal media with no scattering,
the machine learning algorithm comprises a loss function, and
the loss function is derived from a Poisson distribution or from a Negative Binomial distribution.

11. The method of claim 1, wherein:
the first NSC dataset X1 and the first SC dataset Y1 are each electronic transmission probabilities, and
the mapping of the first NSC dataset X1 to the first SC dataset Y1 utilizing the machine learning architecture to generate the mapping function F comprises obtaining a joint probability distribution p(X,Y) utilizing a semi-supervised learning framework selected from a generative adversarial network (GAN) and a variational autoencoder (VAE).

12. The method of claim 11, wherein the GAN is selected from a PixelGAN, a CycleGAN and an InfoGAN.

13. The method of claim 1, wherein the first NSC dataset X1 and the first SC dataset Y1 are each electronic band structures for mono-atomic, binary, ternary and/or quaternary materials.

14. The method of claim 1, wherein:
the first NSC dataset X1 and the first SC dataset Y1 are each transmission probabilities through interface structures of A/B or A/B/C, and
A, B and C are each materials the same as one another or different from one another.

15. The method of claim 1, wherein the first NSC dataset X1 and the first SC dataset Y1 are each atomic forces and/or phonon related quantities selected from phonon band structures and phononic transmissions.

16. The method of claim 1, wherein the first NSC dataset X1 and the first SC dataset Y1 are each densities of allowed electronic levels in materials.

17. The method of claim 1, wherein the first NSC dataset X1 and the first SC dataset Y1 each comprise more than one kind of physical quantities.

18. A system to obtaining learned self-consistent electron density and/or a derived physical quantity, the system comprising:
a first computing model configured to conduct non-self-consistent (NSC) calculation to generate a first NSC dataset X1 from a first plurality of configurations of atoms;
a second computing model configured to conduct self-consistent (SC) calculation to generate a first SC dataset Y1 from the first plurality of configurations of atoms; and
a machine learning architecture configured to map the first NSC dataset X1 to the first SC dataset Y1 through a mapping function F; and to generate a learned self-consistent data Y2 from a new NSC data X2 utilizing the mapping function F.

19. The system of claim 18, wherein the generating of the learned self-consistent data Y2 from the new NSC data X2 utilizing the mapping function F does not include iterating to self-consistency by utilizing a Schrodinger-Poisson technique.

20. The system of claim 18, wherein the machine learning architecture is on a computing device comprising a graphics processing unit (GPU) or a field programmable gate array (FGPA).

* * * * *